United States Patent [19]

Hamel

[11] Patent Number: 4,492,878
[45] Date of Patent: Jan. 8, 1985

[54] ELECTRICAL LINE REVERSAL AND PROTECTION SYSTEM

[76] Inventor: Howard L. Hamel, 67 Winthrop Rd., East Greenwich, R.I. 02818

[21] Appl. No.: 498,020

[22] Filed: May 25, 1983

[51] Int. Cl.³ .............................................. H02H 3/26
[52] U.S. Cl. ...................................... 307/127; 361/44; 361/46; 361/84; 361/77; 363/63
[58] Field of Search ................... 307/127, 326, 328; 361/42, 44–46, 77, 84; 320/25; 363/63

[56] References Cited

U.S. PATENT DOCUMENTS

| | | | |
|---|---|---|---|
| 2,870,380 | 1/1959 | Rocha | 361/43 |
| 3,713,011 | 1/1973 | Johnson et al. | 363/63 |
| 3,764,885 | 10/1973 | Buxbaum et al. | 363/63 X |
| 3,944,891 | 3/1976 | McDonald et al. | 307/127 X |
| 3,947,859 | 3/1976 | Menmuir et al. | 307/127 |
| 4,031,431 | 6/1977 | Gross | 361/42 X |
| 4,087,846 | 5/1978 | Hughes et al. | 361/42 |

Primary Examiner—A. D. Pellinen
Assistant Examiner—Derek Jennings
Attorney, Agent, or Firm—Barlow & Barlow, Ltd.

[57] ABSTRACT

An electrical apparatus that is adapted to be connected between a source of alternating current supply and a load is designed to achieve automatic correction of hot and neutral lines at the output should the supply lines at the input be reversed, and is arranged to be utilized in connection with a ground wire. To achieve the result, a change-over switch is provided in each of the phase wires and a logic circuit is provided for operating the switch, the logic circuit being arranged to detect a voltage change between one of the phase wires and the ground wire so that when a voltage change is detected, the logic circuit will energize the switch to reverse the connection of the supply lines to the load. Two types of change-over switches are disclosed, one in the form of a relay and the other in the form of solid state triacs.

3 Claims, 4 Drawing Figures

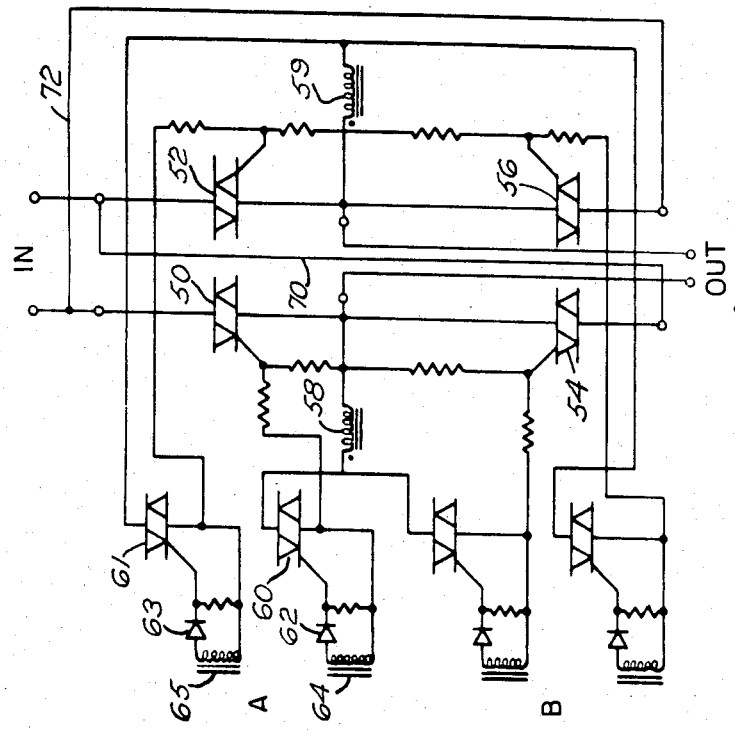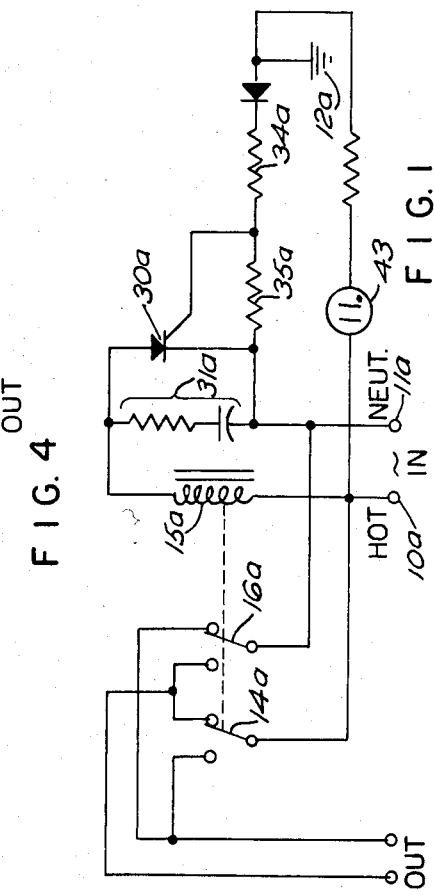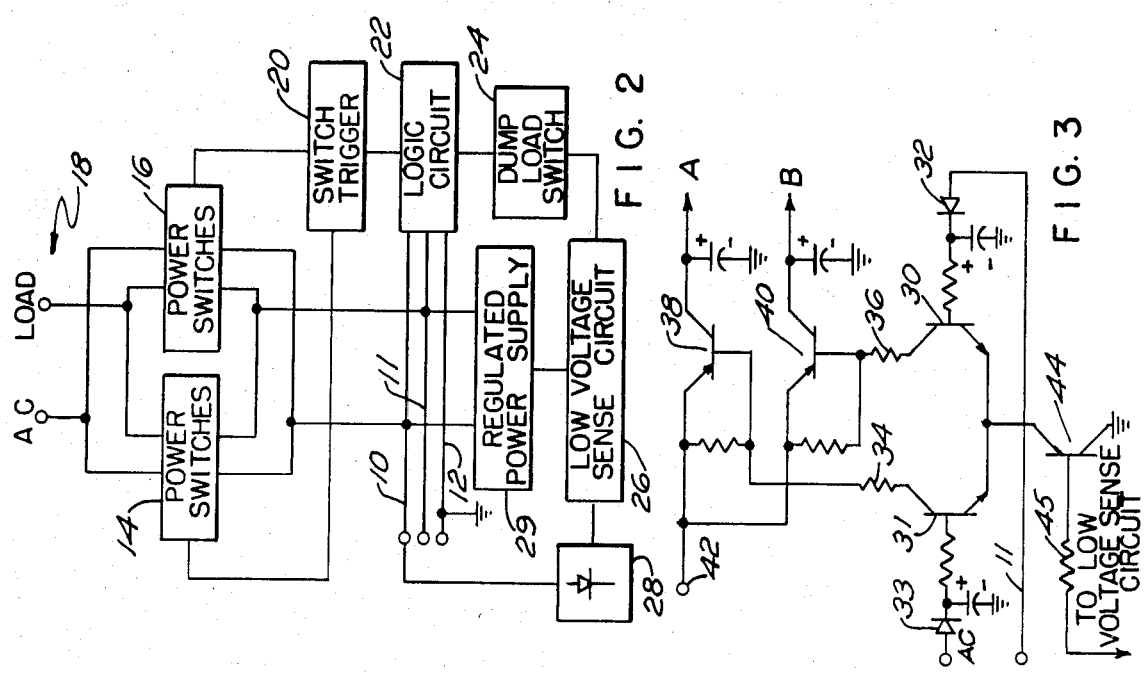

ELECTRICAL LINE REVERSAL AND PROTECTION SYSTEM

BACKGROUND OF THE INVENTION

In the past it has been customary to provide line switching devices which are effectively connectable in either direction to a source of alternating current supply, which supply would possess a ground or near ground conductor and one or more ungrounded conductors. The apparatuses of the prior art of which we are familiar incorporate relay arrangements that are selectively controlled in accordance with the direction of connection of the device to the alternating current supply. A typical form of equipment which meets this criteria is seen in the Rocha U.S. Pat. No. 2,870,380.

In mobile installations such as in mobile homes and in boats, difficulties can easily be encountered when an error is made in connecting the wires at the supply receptacle where the home or boat wishes to plug in. While it is customary to provide signalling devices such as buzzers or lights or the like to indicate errors in wiring, it becomes apparent that if there is an error in wiring, that short of rewiring the power supply receptacle, it becomes difficult for the average user to correct the situation. Also, and particularly in mobile situations, there is a possibility of an explosive gas mixture being present, which is particularly true in boats; further, approval of the authorities cannot be had with any device that could cause arcing, which would include manual switches and/or relays.

It has also been previously proposed in the past to provide additional protection to load circuits. To this end it has been customary to find ground-fault detectors wired into circuits, and these devices are principally designed to trip a circuit breaker whenever a dangerous leakage current develops as a result of faulty wiring. Such a device, however, protects only against one possible malfunction, which could threaten the safety of a human user or in the alternate, damage any equipment connected to the power source.

SUMMARY OF THE INVENTION

An object of the present invention is to provide an automatic line reversing unit that may be placed between a source of power and a load which will reverse the supply lines at the load terminals. It is a further object of the present invention to provide an automatic line reversing unit which would be used between a source of power and a load, which not only will reverse the lines, but may also act as a ground-fault detector to disconnect the load from the supply, which ground-fault detector will operate in conjunction with a low voltage sensing device to disconnect the load if the voltage falls below an acceptable level.

The above objects are achieved by providing either a d.p.d.t. relay or switchable triacs which will achieve the function of a double pole/double throw switch, and which can be multiplied by increasing the poles to achieve two-phase and three-phase switching with reversing properties. The switching triacs are triggered by secondaries of a transformer which is connected to the input supply and are arranged in such a way that by including a zero crossing detector in the trigger circuit, the triacs may be turned on alternately when the voltage is going through zero. A logic circuit is connected to the source of supply and if the system is connected improperly, the trigger circuit will actuate a relay or reverse the triacs. Further, in one embodiment, if the ground wire is not connected, then the logic circuit becomes inactivated and neither of the triac groups are allowed to be turned on. Connected to the logic circuit is a dump load switch which is actuated by a voltage sensing circuit in the form of a voltage comparator so that if the voltage drops below a preset level, then the logic circuit becomes totally inactive.

BRIEF DESCRIPTION OF THE DRAWINGS

FIG. 1 is a schematic of a single phase line reversing system using a relay switch;

FIG. 2 is a block diagram illustrating a semi-conductor system;

FIG. 3 is a circuit diagram illustrating the logic circuit and the switching trigger; and FIG. 4 is a circuit diagram illustrating the triac reversing system according to the invention.

DETAILED DESCRIPTION

Referring now to FIG. 1, there is shown an electrical circuit diagram for an embodiment of the invention that will sense the lack of a proper ground as well as to reverse the lines of any of the main phase wires. In its simplest form a single phase arrangement is illustrated and there is seen at 10a, 11a input wires from a single phase source in which wire 11a shall be denoted as the so-called neutral wire, and the ground symbol 12a shall be deemed to be the ground connection, which in standard wiring practice becomes the "green" wire. The change-over switches illustrated in the diagram are a pair of single pole/double throw switches, there being a switch 16a and a second switch 14a that are controlled by a coil and find themselves in a relay configuration with an actuator coil seen at 15a.

As illustrated in the circuit diagram, the arrangement is shown in its normal condition, in which the source and the load are properly connected with neutral to neutral. Should there be a neutral to hot connection, it is advantageous to switch the lines; and to accomplish this, a logic circuit is provided in the form of a silicon controlled rectifier 30a which is connected in series with the relay coil 15a, between the neutral wire 11a and the hot wire 10a. A sensing network consists of a diode 32a and resistors 34a, 35a that are connected in series between the green wire terminal 12a, and the neutral connection 11a. Resistor 35a is found across the cathode to gate of the silicon controlled rectifier 30a. Also seen in the diagram is a suppression circuit for radio frequency interference consisting of a filter network designated 31a which suppresses spikes generated by the switching of the silicon controlled rectifier.

In operation when a potential exists at the neutral terminal 11a, which is greater than 15 volts as referred to ground at 12a, positive pulses will be provided to the gate of the silicon controlled rectifier, which will be activated and conduct to, in turn, cause a pulsating D.C. current to flow through the relay coil 15a and actuate switches 14a, 16a, thus reversing the connections from the alternating current supply to the alternating current load.

In addition if a proper ground exists in the circuit, a neon indicator light 43 will light, which light is connected between the so-called hot terminal of the input source and thence through a dropping resistor 45 to the ground 12a. Illumination indicates that a safe condition exists insofar as ground is concerned with respect to the use of devices connected to the output terminals.

The solid state system shown in FIG. 2 is illustrated as being connected to a normal single phase alternating current supply of 120 volts, having a so-called "black" or hot wire 10, a "white" wire 11 that is at or near ground potential, and a "green" or ground wire 12. This supply is connected directly to the change-over power switches 14 and 16 which in turn are connected to an AC load shown as two terminals, which load is generally designated 18. As will be seen by referring to the drawings, the switches have at their inputs both sides of the line 10 and 11 and can select the manner in which those lines are connected to the output as will become more readily apparent as this description proceeds.

For controlling the power switches there is a switch trigger circuit 20 which will operate to activate one or the other of the set of power switches, and will contain, in addition to simple triggering for the output triacs, a zero crossing detector such as disclosed in U.S. Pat. No. 3,882,328, which will allow the triacs to be turned on while the voltage is going through zero. Connected to the switch trigger is a logic circuit so that, if the system is connected properly with the wire 11 being the neutral or almost ground potential, then it will sense that the wire 11 and the ground wire 12 are effectively connected together, and allow the triacs to be sequenced with normal switching. If on the other hand the wiring is reversed, then it will completely deactivate the switch trigger. In addition to the logic circuit 22 there is connected to the logic circuit a dump load switch 24 which senses whether or not the wire 12 is connected to ground, for if the wire is not connected to ground, then it will completely deactivate the logic circuit and act as a ground fault detector, making the whole system inoperative.

A low voltage sense circuit 26 is provided which is in effect a voltage comparator that compares a portion of the rectified line voltage being essentially provided by the power supply 28 with a regulated power supply 29 being provided to properly power the voltage comparator.

Referring now to FIG. 3, there is shown schematically a part of the switch trigger circuit 20, the logic circuit 22 and the dump load switch 24. Starting with the logic circuit there is shown a pair of NPN transistors 30 and 31, the bases of which are connected through diodes 32 and 33 to both sides of the AC line, as represented by the wires 10 and 11. Effectively, as can be seen in the drawing, the rectifiers 32 and 33 act as half-wave rectifiers, the outputs of which are smoothed by the electrolytic capacitors, the series resistors forming a voltage divider network which provide the proper base voltage on the transistors 30 and 31 so that they may act as switches. Resistors 34 and 36 in the collector circuit limit the base current and effectively also connect to the bases of PNP switches 38 and 40, respectively, which act as primary switch circuit, the emitters of which are connected to a regulated supply as at terminal 42. Switches 38 and 40 are connected respectively to switch channels A and B. In addition the emitters of transistors 30 and 31 are connected together and to the collector of an NPN switching transistor 44 which acts as a dump load switch as seen in the block diagram of FIG. 1, and which simply has its emitter connected to ground and its base, through a base current limiting resistor 45, is connected to a low voltage sensing circuit.

To understand how this particular part of the system operates, if the AC is properly connected with the wire 11 connected to near ground, then this wire and the real ground wire 12 are effectively connected together, and no voltage is applied to the base of transistor 30. If on the other hand the wiring is reversed, then no voltage is applied to the base of transistor 31. Since channel A represents a normal and proper connection, normal operation where line 10 is hot will mean that voltage is applied to the base of transistor 31 and switch 38 is activated sending an "on" signal through channel A with no signal at channel B. Also it should be noted that if the wire 12 is not grounded, then voltage is not applied to either transistor 30 or 31 and neither channel is activated. This arrangement accordingly constitutes not only an improper supply line connection detection arrangement, but also a ground-fault detector circuit.

As was mentioned previously, there is a low voltage sensing circuit 26 that compares a portion of the rectified line voltage to a fixed reference voltage, the operation of which is well known to those skilled in the art. Essentially it consists of an integrated circuit such as an RCA CA 3059; and the output of this integrated circuit will be normally high on the order of, say, two volts; and when it is activated, the voltage will drop through zero to approximately minus 0.5 volts; and when the output drops to a negative voltage, the transistor 44 will become open due to the lack of a positive base voltage, thus making both channels inoperative regardless of the other connections.

Referring now to FIG. 4, the double pole/double throw switch arrangement and part of its triggering has been illustrated and consists essentially of two pairs of output triacs, there being output triacs 50 and 52 for channel A and output triacs 54 and 56 for channel B. The triacs are basically turned on by the secondaries of 58 and 59 which are connected to the transformer that has its primary connected to the line, which transformer is not shown; and the voltage from secondary 58 is effectively applied to the trigger of triac 50 via control triac 60 which is turned on by an indication from channel A, which includes not only the switch 38, but also the zero corssing detector which allows first secondary 64 to have a signal, and thence secondary 65, the signal then being converted to a uni-directional pulse by diodes 62, 63. As can be seen, the arrangement is such that when triacs 50 and 52 are turned on, triacs 54 and 56 will be turned off, and double pole/double throw switching action can be achieved since the output will effectively reverse the lines as seen by the crossover wires such as the wires 70 and 72. While only channel A has been described circuit wise, channel B is identical and reference numerals have been eliminated therefrom for clarity, since it will be clear to anyone skilled in the art the manner in which this operation can be achieved.

I claim:

1. An electrical apparatus connected between an alternating current supply and a load for the automatic reversal of the connection of supply lines to a load which has a near ground conductor comprising in combination an alternating current source and a load, said source and said load having at least a ground wire and a pair of phase wires; a change-over switch means comprising two pairs of triacs with both anodes of each pair connected together to one phase wire, one of the other anodes of each pair being connected to a separate load phase wire; a logic circuit including a pair of three-terminal semi-conductors, each with a control electrode and output electrode for operating the switch means; said control electrode connected to a phase wire for detecting a voltage change between one of the phase wires and the ground wire whereby when a voltage change is detected the output electrode will energize the gate of one triac of each pair to change the connection of said supply to said load.

2. An electrical apparatus as in claim 1 wherein a dump switch is connected between the input electrode and ground for detecting ground fault.

3. An electrical apparatus as in claim 1 wherein said semi-conductors have one of their other electrodes connected to a third semi-conductor having a control electrode coupled to the current supply and an output electrode coupled to the input electrodes of said pair of semi-conductors, said third semi-conductor being responsive to low voltage and turning the pair of semi-conductors off.

* * * * *